United States Patent [19]

Francklyn

[11] 4,272,904
[45] Jun. 16, 1981

[54] CRAB POT HANDLING APPARATUS AND METHOD

[76] Inventor: Gilbert W. Francklyn, 1160 Comyn Rd. NW., Poulsbo, Wash. 98370

[21] Appl. No.: 82,743

[22] Filed: Oct. 9, 1979

[51] Int. Cl.$^3$ .............................................. A01K 69/08
[52] U.S. Cl. ........................................ 43/4.5; 43/100; 43/102; 43/6.5; 414/140; 298/17.5
[58] Field of Search .................... 43/4, 4.5, 6.5, 100, 43/102; 414/140, 680; 114/255; 298/17.5

[56] References Cited

U.S. PATENT DOCUMENTS

| | | | |
|---|---|---|---|
| 3,111,102 | 11/1963 | Gorton | 43/4.5 X |
| 3,257,008 | 6/1966 | Luketa | 414/140 |
| 3,465,901 | 9/1969 | Grabowski | 43/102 X |

FOREIGN PATENT DOCUMENTS 725364  1/1966  Canada ...................................... 43/100

Primary Examiner—Harold D. Whitehead
Assistant Examiner—K. Bradford Adolphson
Attorney, Agent, or Firm—David L. Garrison

[57] ABSTRACT

A crab pot handling apparatus comprising a sorting bin means for receiving, holding and disposing of the contents of a crab pot, and a crab pot launcher for holding and launching a crab pot. The crab pot handling apparatus is pivotally mounted on the gunwale near the side of a crab harvesting vessel. The crab pot launcher is comprised of a first planar launching deck with crab pot engaging means thereon. The sorting bin is pivotally positioned adjacent the crab pot launcher. The sorting bin means is comprised of a structural frame with sorting surface and fencing means along portions of the periphery of the sorting surface and is rotatable into juxtaposed position over the aforementioned crab pot launcher for baiting and launching pots whenever no sorting function is required.

6 Claims, 11 Drawing Figures

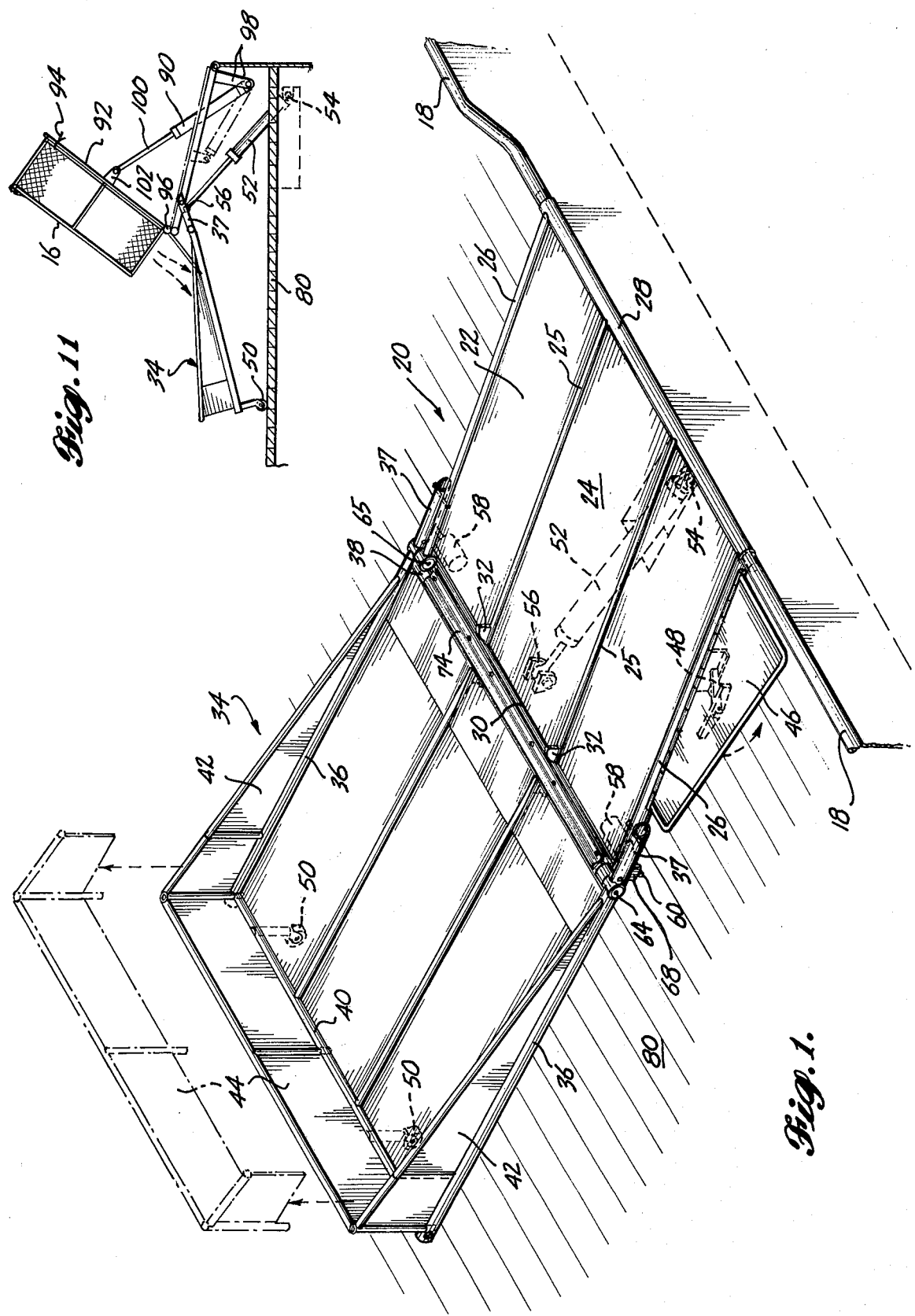

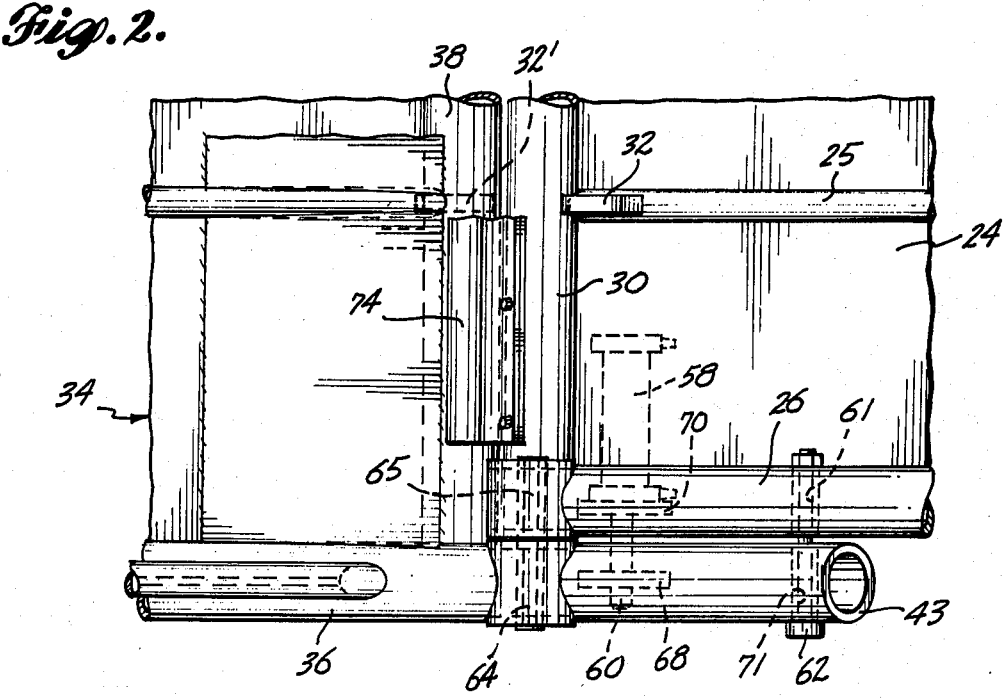
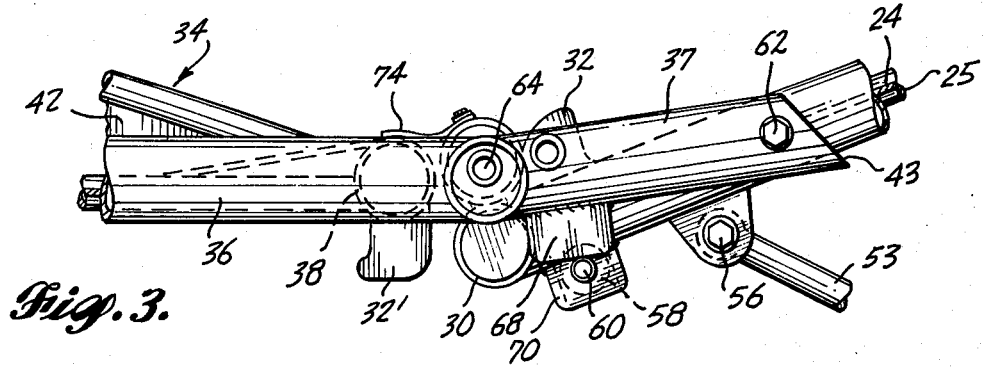
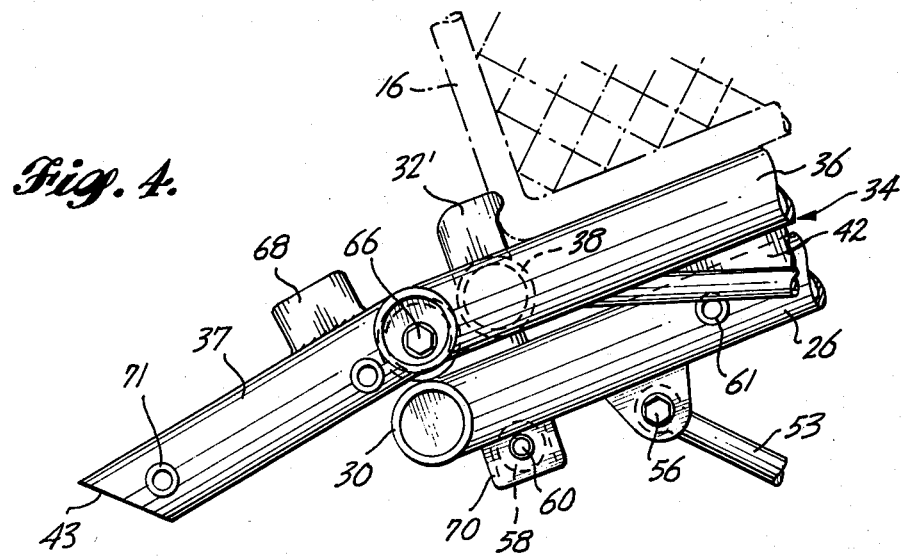

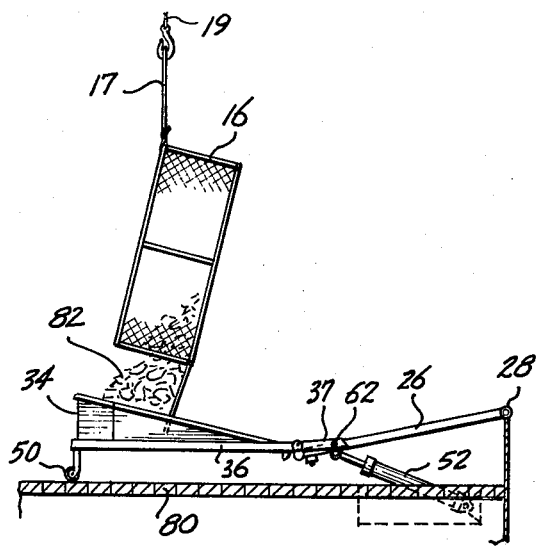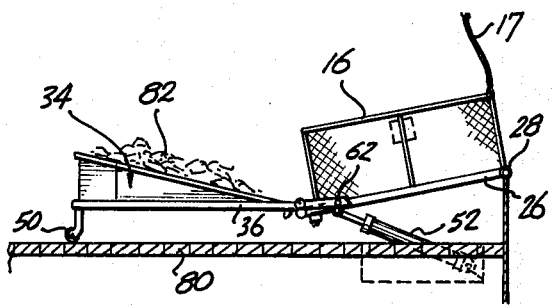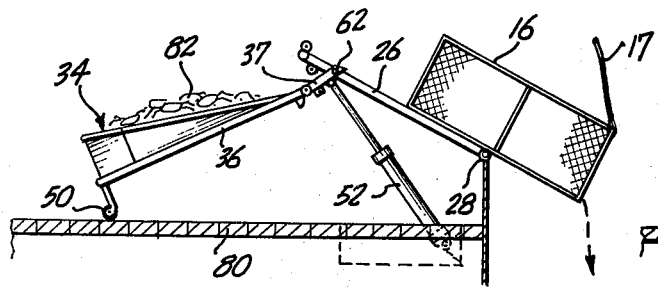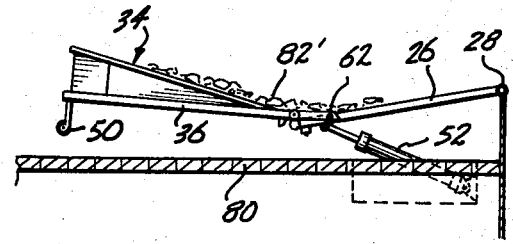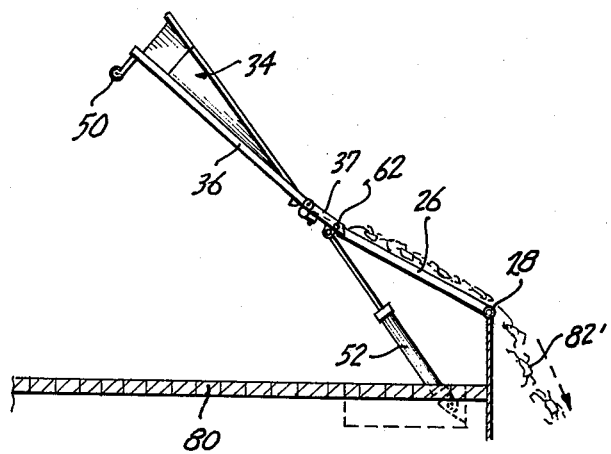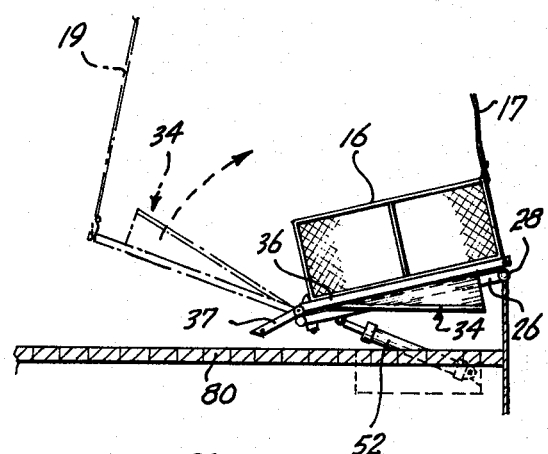

CRAB POT HANDLING APPARATUS AND METHOD

BACKGROUND OF THE INVENTION

1. Field of the Invention

The field of this invention includes methods and apparatus useful for the harvesting and sorting of aquatic life including various species of crabs using crab pots or traps.

2. Description of the Prior Art

Prior art methods for manipulating crab traps or pots include removing the crab pot from the sea with a lifting device such as a hydraulic operated line hauling winch and thereafter dumping the crab pot contents onto the deck of the harvester boat. The deckhands then sort the harvestable crabs from the catch and store them. The remainder of the catch including female, immature or incorrect species of crabs as well as some fish and other aquatic life is then returned to the sea by shovelling it over the gunwale, or sluicing it through the scuppers in the side of the boat. Frequently, the female crabs and immature crabs are injured in the process. In addition, the harvestable crabs scramble about the deck making their capture and confinement difficult. Occasionally harvestable crabs are lost overboard.

SUMMARY OF THE INVENTION

An object of this invention is to provide means and method for handling crab pots on board a crab fishing vessel.

A further object of this invention is to provide a receptacle positioned at a convenient but variable height for sorting the contents of crab pots when brought on board a vessel and to provide a stable platform at a convenient level for repair, baiting and relaunching of the crab pots.

Another object of this invention is to provide an apparatus for quickly and easily disposing of the non-harvestable contents of a crab pot over the side of a vessel.

The apparatus comprises two principal parts, namely, the crab pot launcher and the sorting bin, which are pivotally interconnected. The crab pot launcher includes a planar launch deck with raised pot engaging elements thereon to position the pot for emptying and for baiting and repairs. A sorting bin is pivotally attached to one side of the crab pot launcher and includes a "U" shaped structural frame, the open end of the "U" shaped structural frame pivotally engaging the crab pot launcher with a selectively engagable means for preventing relative rotational motion between the two parts when desired. The upper surface of the bin comprises a sorting surface and is bounded by upright, removable restraining walls supported by the structural frame. The restraining walls may be constructed of expanded metal or similar webbing or may be solid. The structural frame, restraining walls and sorting surface form a sorting bin for receiving the contents of a crab pot. The sorting bin is constructed and arranged to permit rotation into a position overlying the crab pot launching mechanism in a position in which the sorting surface of the sorting bin is face adjacent the upper surface of the planar launch deck. The surface of the sorting bin which is now upwardly exposed has means thereon similar to the crab pot launcher for engaging and positioning the crab pot for retrieval or launching, such as will be encountered in the instance of initial placement of the pot at the first of the season. The space occupied by the apparatus thus is minimized, permitting more of the deck area of the ship to be occupied by crab pots during transit to and from the port prior to and following the crab season. With the sorting bin rotated completely over onto the crab pot launcher, the apparatus is operated similarly to the launcher in the preparation and launching of crab pots, but without the sorting function apparatus provided when the sorting bin is rotated away from the upper surface of the pot launcher.

BRIEF DESCRIPTION OF THE DRAWINGS

FIG. 1 is a perspective view of the crab pot launcher and sorting bin;

FIG. 2 shows a plan view of one portion of the apparatus shown in FIG. 1;

FIG. 3 is a side elevational view of a portion of the apparatus of FIG. 1;

FIG. 4 is another side elevational view of the segment of the apparatus shown in FIG. 3 having the sorting bin rotated into position superjacent the crab pot launcher;

FIG. 5 is a schematic side elevational view of the apparatus of this invention showing the contents of the crab pot being dumped into the sorting bin;

FIG. 6 is a side elevational view of the apparatus shown in FIG. 5 with the crab pot open for rebaiting and crabs shown in the sorting bin;

FIG. 7 is a side elevational view of the apparatus shown in FIG. 5 showing launching of the crab pots and simultaneous sorting of the crabs in the sorting bin, the bin and launch surfaces being pivoted upwardly;

FIG. 8 shows a side elevational view of the apparatus shown in FIG. 5 raised to a convenient level for sorting of the crabs in the sorting bucket;

FIG. 9 shows a side elevational view of the apparatus shown in FIG. 5 showing dumping of the female and small male crabs along with any other debris over the gunwale of the boat;

FIG. 10 is a side elevational view of the apparatus shown in FIG. 5 set up for baiting and launching the crab pots without the crab sorting function;

FIG. 11 is a side elevational view of a second embodiment of this invention showing integral means for dumping crabs from the crab pot using a picking boom without the use of an overhead crane.

DESCRIPTION OF THE PREFERRED EMBODIMENT

Referring specifically to the drawings wherein like numerals indicate like parts, there is seen specifically in FIGS. 1-4 a crab pot launching and crab sorting bin apparatus 20 comprised of a pot launching means 22 having a launch surface 24 on the upper side thereof. A substantially rectangular frame having side elements 26, gunwale-engaging bearing element 28 and a rear frame member 30. The frame elements recited are connected together suitably to form a rigid frame carrying surface 24. A pair of pot stops 32 are positioned adjacent the rear frame member 30 and serve to engage the crab pot, preventing the pot from sliding further into the adjacent sorting bin 34 during the crab sorting and crab pot baiting and preparation stops more fully described below. The sorting bin 34 is constructed of tubular frame members including side frames 36, front frame member 38 and rear frame member 40, all interconnected together to form a rigid unitary structure. Plates 41 extend between stiffeners 39 and side frame members 36 to close in the bottom of the sorting bin and provide a surface upon which crabs may be dumped and then sorted to remove the harvestable males from the female crabs and small crabs. Side enclosures 42 are positioned upstanding from the bin side frame members 36 to contain crabs on the sorting surface. A removable rear enclosure member 44 is positioned upstanding from the rear frame 40 to a height convenient for removal of crabs from the sorting surface. The removable rear enclosure member 44 is easily detached from the sorting bin 34 to permit rotation of the sorting bin about bushing 65 into a nestled and stowed position on top of pot launcher 22 so that the apparatus takes up a minimum of deck space during transit to and from the crab harvesting ground, and to permit operation of the apparatus as a crab pot launcher without the sorting function. Wheels 50 support the back end of sorting bin 34 and permit the sorting bin to travel across deck 80 during pot launching.

As is best seen in FIGS. 2, 3 and 4, the pot launching means 20 and the crab sorting bin 34 are pivotally interconnected at two separate pivot locations for performing functions as will be presently described. A first pivot location is provided by the eccentric stowing and baiting pivot 64 cooperating with bushing 65. This pivot location permits rotation of sorting bin 34 into a stowed position as is best seen in FIGS. 4 and 10. As will be noted, the eccentric pivot 64 causes the side frame 36 to rotate into a position with side frame 36 above and substantially parallel to side frame 26, permitting the sorting bucket 34 and pot launching 20 to nestle together. Side frame extensions 37 project rearwardly as is best seen in FIGS. 4 and 10, so that the beveled end 43 of side frame extensions 37 may securely engage the deck 80 of the ship and act as supporting feet for the mechanism when configured as shown in FIG. 10.

The second pivot location as is best seen in FIGS. 2 and 3 is provided by pin 62 inserted into apertures 61 and 71. Rotation about pin 62 occurs when pin 66 is removed and pin 60 retracted, permitting relative rotation of the pot launching means and the sorting bin 34. Movement such as is shown in FIG. 7 is thus possible, permitting simultaneous launching of the crab pot 16 and sorting of the crabs 82.

During the normal cycle of harvesting of crabs using the apparatus of this invention, the equipment is operated in the manner shown in FIGS. 1-3 and 5-9. As shown therein, the combined crab pot launching and sorting apparatus is arranged with pin 62 inserted through apertures 71 and 61 and fastened securely to provide a pivot point adjacent the end of side frame extensions 37 and a point positioned toward the gunwale from the rear frame members 30 on side frame members 26. Whenever a crab pot 16 is drawn over the gunwale 18 by means of the usual crane type hoist mechanism connected to cable 19, the apparatus is positioned as shown in FIG. 5 with the pot launching means 22 and the bottom of sorting bin 34 substantially parallel to deck 80. The crabs 82 contained within pot 16 are dumped onto the sorting bin 34 and the pot is then placed on the pot launching means 22 as shown generally in FIG. 6. The door 15 of pot 16 remains open following dumping of the crabs permitting access for the purpose of renewing the bait, repairing the pot and any resetting of the mechanism for catching additional crabs. Simultaneously, harvestable crabs from the pile 82 of crabs are removed and placed into suitable containers, usually large tanks in the hold of the ship. The pot, upon completion of rebaiting and closing of the door 15, is launched by upward rotation of pot launching mechanism 23 by extending cylinder 52 so that the pot launching means 22 is inclined with respect to the deck. As is shown in FIG. 7 the pot will then slide off the launching means 20 into the water and settle to the bottom, the location being marked and subsequent retrieval enabled by pot line 17. During this phase of the operation the sorting of crabs from the crab pile 82 continues. As soon as the pot is launched the launching mechanism is lowered by retracting ram 53 into hydraulic cylinder 52 so that the pot launching means assumes the position as shown in FIGS. 1, 5 and 6. A locking mechanism including pin 60 is then extended by means of hydraulic operators 58 to engage the bottom side of pad 68, as is best seen in FIG. 3. This locks the mechanism and prevents relative rotation between pot launching means 22 and sorting bin 34. Extension of the ram 53 from hydraulic cylinder 52 then raises the sorting bin 34 into the position shown in FIG. 8 at which a more convenient height is achieved for sorting of the remaining crabs in the sorting bin 34. Most of the inconvenience and stooping necessary in the prior art methods of sorting crabs is thus eliminated.

As soon as all harvestable crabs are removed from the sorting bin 34 the entire apparatus is raised into the position shown in FIG. 9 by rotation about the gunwale 18 so that all remaining crabs, including those too small for harvest and females, are dumped over the side with a minimum of damage. The apparatus may then be lowered into the position shown in FIG. 5 to receive the next crab pot full of crabs for sorting.

An alternate embodiment of this invention is shown in FIG. 11. This embodiment is well adapted for usage on boats which have picking booms but no cranes. In operation the apparatus shown in FIG. 11, in addition to the elements previously described with respect to the other FIGS. shown, further includes a second hydraulically-operated cylinder 90 and ram 100 adapted to raise and lower pot support 92. The pot is initially placed in a position much like that shown in FIG. 6. On the pot launching mechanism, the door is opened and piston and cylinder 90 extended to raise the pot into the position shown in FIG. 11. This angle shown for the pot is sufficient to cause the crabs to tumble out upon sorting bin 34' for sorting purposes much as described above. Pot 16' is then rotated downwardly by retracting ram 100 into cylinder 90 and the pot rebaited and launched in a fashion similar to that described above with respect to FIGS. 6 and 7. The remaining steps in utilizing the apparatus shown in FIG. 7 are substantially identical to those described above with respect to the other drawings.

While this invention has been described with specific reference to preferred embodiments, it is to be understood that variations and modifications within the abilities of one skilled in the art are considered to be within the scope of this invention.

I claim:

1. An apparatus for receiving, holding and disposing of a crab pot catch comprising:
a first structural frame means having a pivotal engagement with a crab harvesting vessel near the gunwale for rotation from a first sorting position to a second dumping position and having first crab pot engaging means thereon for supporting and launching a crab pot;

a second structural frame means pivotally interconnected to said first frame means and having a sorting surface thereon for recovering crabs said second frame means adapted for rotation into stowed engagement upon said first frame means;

upstanding enclosure means along portions of the periphery of said second structural frame forming with said sorting surface a sorting bin means for receiving and holding the crab pot catch; and means for rotating said first structural frame means about said pivotal engagement from said first sorting position to said second dumping position whereby the non-harvestable portion of the catch not removed from said sorting bin means are dumped overboard.

2. The apparatus of claim 1 where said second frame means has second crab pot engaging means thereon exposed for usage whenever said second frame means is rotated into stowed engagement upon said first frame means whereby said apparatus is usable as a crab pot baiting and launching means without a crab sorting function.

3. The apparatus of claim 1 including selective means for preventing relative rotation of said first and second frame means whereby upward rotation of said first frame means with respect to said vessel moves both said first and said second frame means as a unit from a sorting position into a dumping position.

4. The apparatus of claim 3 wherein said rotation with respect to said vessel is induced by extension and retraction of a hydraulic cylinder extending between said vessel and said first frame means.

5. The apparatus of claim 1 further including means for inclining said first crab pot engaging means with respect to said first frame means to dump contents of said pot into said sorting bin means.

6. A method of handling and sorting a crab pot catch comprising:

removing the crab pot from a water body to a crab harvesting vessel having a crab pot launching surface pivotally mounted on the gunwale of said vessel, said surface having a sorting surface pivotally attached to the edge opposite the pivotal mount on said gunwale;

placing the crab pot catch on said sorting surface;

sorting the harvestable crabs from said crab pot catch so confined on said sorting surface and simultaneously rebaiting and preparing the pot for launching;

rotating said launching surface upwardly to launch said pot;

pivoting said launching surface downwardly and then locking said launching and said sorting surfaces together to prevent relative rotation there between and to form a disposal slide for dumping debris from said sorting surface; and dumping the non-harvestable portion of said catch remaining on said sorting surface into the surrounding water body by rotating said sorting surface and launching surface into an inclined position.

* * * * *